(12) United States Patent
Xia et al.

(10) Patent No.: US 10,311,690 B2
(45) Date of Patent: Jun. 4, 2019

(54) SYSTEMS AND METHODS FOR DETECTING MOTION BASED ON A VIDEO PATTERN

(71) Applicant: Honeywell International Inc., Morristown, NJ (US)

(72) Inventors: Xiaomin Xia, Shenzhen (CN); Di Wu, Shenzhen (CN); Chao Liu, Shenzhen (CN); Tianfeng Zhao, Shenzhen (CN)

(73) Assignee: ADEMCO INC., Golden Valley, MN (US)

( * ) Notice: Subject to any disclaimer, the term of this patent is extended or adjusted under 35 U.S.C. 154(b) by 191 days.

(21) Appl. No.: 15/220,996

(22) Filed: Jul. 27, 2016

(65) Prior Publication Data

US 2018/0033271 A1 Feb. 1, 2018

(51) Int. Cl.
| | |
|---|---|
| *G02B 3/08* | (2006.01) |
| *G08B 13/196* | (2006.01) |
| *G02B 13/14* | (2006.01) |
| *G06K 9/00* | (2006.01) |
| *G06K 9/62* | (2006.01) |

(52) U.S. Cl.
CPC ......... *G08B 13/19602* (2013.01); *G02B 3/08* (2013.01); *G02B 13/14* (2013.01); *G06K 9/00771* (2013.01); *G06K 9/629* (2013.01); *G06K 9/6293* (2013.01)

(58) Field of Classification Search
CPC .... G08B 13/19602; G02B 3/08; G02B 13/14; G06K 9/629; G06K 9/6293
USPC ........................................................ 348/155
See application file for complete search history.

(56) References Cited

U.S. PATENT DOCUMENTS

| | | | | |
|---|---|---|---|---|
| 5,936,666 A | * | 8/1999 | Davis ..................... | G08B 13/19 348/143 |
| 8,044,336 B2 | * | 10/2011 | Stromberg ........... | G08B 13/189 250/216 |
| 9,569,953 B2 | * | 2/2017 | Micko .................... | G01B 11/00 |

(Continued)

FOREIGN PATENT DOCUMENTS

| | | |
|---|---|---|
| GB | 2 303 446 A | 2/1997 |
| WO | 2008/019467 A1 | 2/2008 |

OTHER PUBLICATIONS

Extended European search report for corresponding EP patent application 17178515.7, dated Dec. 7, 2017.

*Primary Examiner* — William C Vaughn, Jr.
*Assistant Examiner* — Jae N Noh
(74) *Attorney, Agent, or Firm* — Husch Blackwell LLP

(57) ABSTRACT

Some systems and methods for detecting motion based on a video pattern can include creating a motion image from a sequence of raw images, masking the motion image with a lens pattern associated with a PIR sensor and an associated Fresnel lens, splitting each of a plurality of blocks of the lens pattern into first and second negative areas, identifying a positive area pixel value as a sum of all pixels in the motion image aligned with the first positive area in the plurality of blocks, identifying a negative area pixel value as a sum of all pixels in the motion image aligned with the second negative area in the plurality of blocks, identifying a motion image response value as a difference between the positive and negative area pixel values, and identifying a presence of motion when the motion image response value exceeds a predetermined value.

14 Claims, 3 Drawing Sheets

(56) References Cited

U.S. PATENT DOCUMENTS

2008/0074252 A1\* 3/2008 Micko ................ G08B 13/191
  340/521
2017/0076588 A1\* 3/2017 Naylor ................ G08B 29/185

\* cited by examiner

SYSTEMS AND METHODS FOR DETECTING MOTION BASED ON A VIDEO PATTERN

FIELD

The present invention relates generally to systems and methods for detecting motion in video. More particularly, the present invention relates to systems and methods for detecting motion based on a video pattern.

BACKGROUND

Systems and methods to detect motion in video are known, but known systems and methods focus on foreground extraction techniques, which can be complicated, and which require memory storage space for storing a background image. For example, known systems and methods highly depend on estimating the background image, and a clear background image is needed to detect motion.

Some known systems and methods selectively update a background image by adding new pixels to the background image when a respective pixel is classified as being part of the background image. However, any incorrect classification will result in incorrectly updating the background image and therefore, cause problems with extracting a foreground image to detect motion.

Furthermore, circumstances in which a long-term scene changes, for example, when a car parked in one space for a month moves, in which high frequency and repetitive movement is present in a background image, for example, when tree leaves, flags, or waves move, or in in which lighting in a scene suddenly or drastically changes, can cause problems in identifying a background image.

In view of the above, there is a continuing, ongoing need for improved systems and methods.

DETAILED DESCRIPTION

Figure 1:
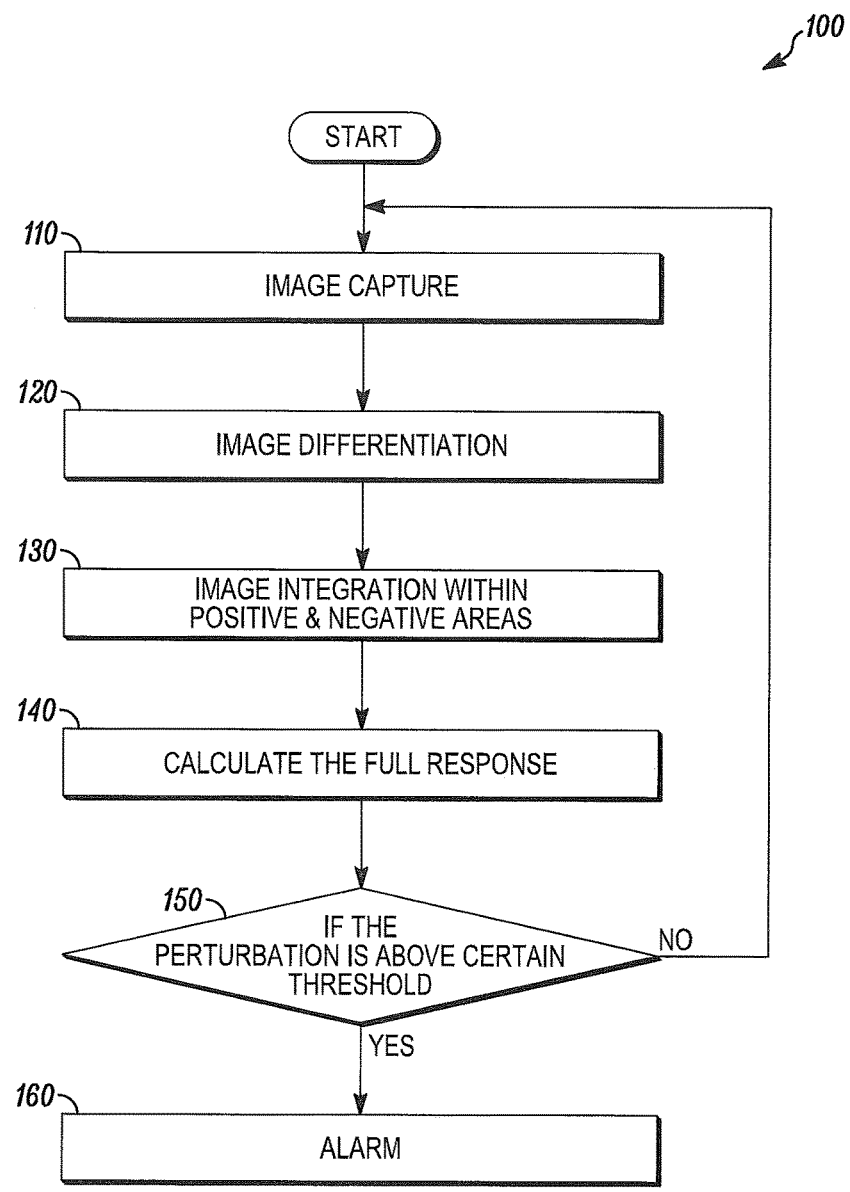
FIG. 1 is a flow diagram of a method in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for detecting motion based on a video pattern. For example, some embodiments of systems and methods disclosed herein can employ a PIR sensor and a lens pattern associated therewith to detect intrusion.

In accordance with disclosed embodiments, a Fresnel lens can be placed in front of a PIR sensor monitoring a region, and the combination of the Fresnel lens and the PIR sensor can be associated with a lens pattern. Separately, a sequence of raw images of a scene in the monitored region can be captured by a video imager, for example, a video camera, and a motion image can be obtained from the raw image, for example, via image or frame differentiation in which one image or frame in the sequence is subtracted from a subsequent image or frame in the sequence so that the resulting motion image includes pixels representing only those portions that are different between the one image or frame and the subsequent image or frame.

In accordance with the disclosed embodiments, the lens pattern associated with the PIR sensor and the Fresnel lens can be used to mask, that is, overlay, the motion image, and each block of the lens pattern can be split into two sections—a first positive area and a second negative area—such that each of the first positive areas is associated with a first slot of the PIR sensor and each of the second negative areas is associated with a second slot of the PIR sensor. In some embodiments, the pixels of the motion image that are aligned with each of the positive areas can be summed to find a positive area pixel value, and the pixels of the motion image that are aligned with each of the negative areas can be summed to find a negative area pixel value. The negative area pixel value can be subtracted from the positive area pixel value to find a motion image response value, and in some embodiments, if the motion image response value is higher than a predetermined value, then systems and methods disclosed herein can determine that motion has been detected in the monitored region. For example, in some embodiments, if the motion image response value is higher than a predetermined value within a predetermined period of time, then systems and methods disclosed herein can determine that motion has been detected in the monitored region.

FIG. 1 is a flow diagram of a method 100 in accordance with disclosed embodiments. As seen in FIG. 1, the method 100 can include capturing a sequence of images of a monitored region as in 110, obtaining a motion image via image differentiation as in 120, identifying a positive area pixel value and a negative area pixel value by masking the motion image with positive and negative areas of a lens pattern associated with a PIR sensor and Fresnel lens as in 130, identifying a motion image response value based on the positive and negative area pixel values as in 140, and determining whether the motion image response value is greater than a predetermined value as in 150. If so, then the method 100 can include determining that motion has been detected and sound an appropriate alarm as in 160.

Figure 2:
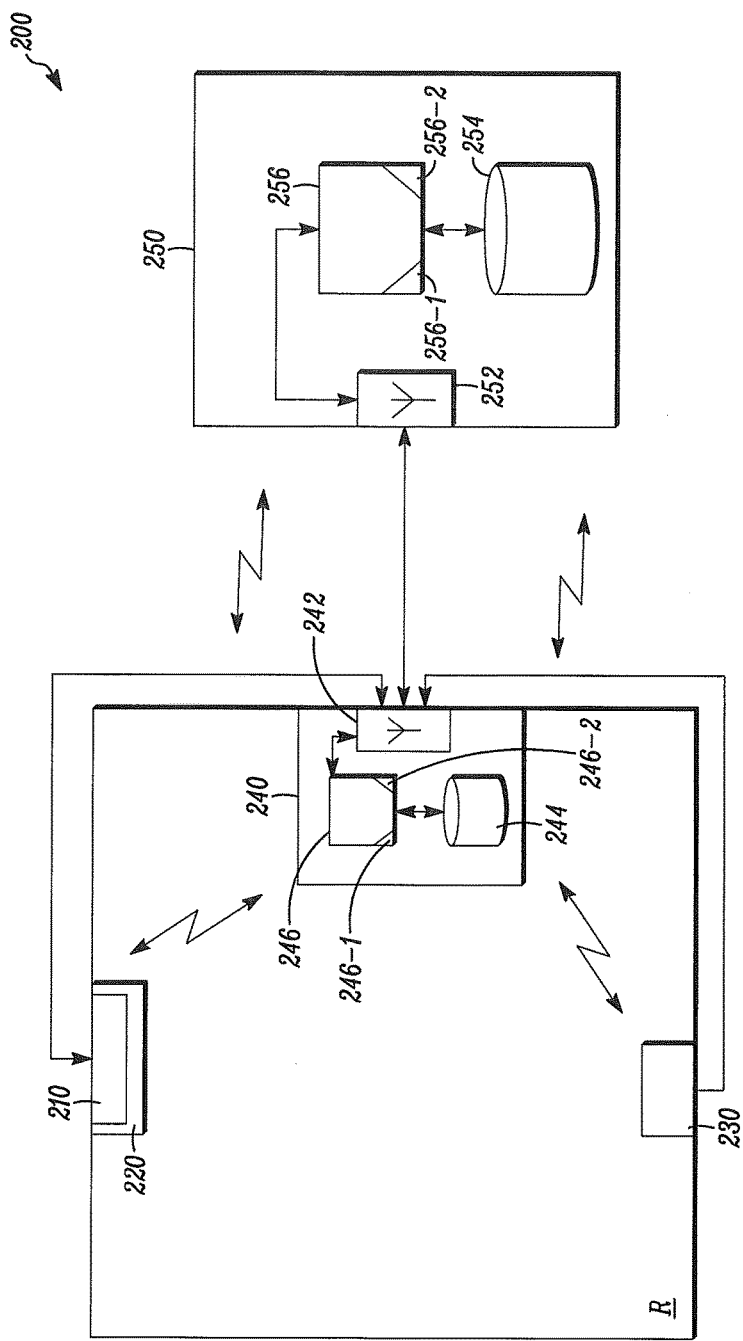
FIG. 2 is a block diagram of a system in accordance with disclosed embodiments.

FIG. 2 is a block diagram of a system 200 in accordance with disclosed embodiments. In some embodiments, the system 200 can execute and control the method 100 of FIG. 1 and others disclosed herein.

As seen in FIG. 2 the system 200 can include a PIR sensor 210 monitoring a region R such that a Fresnel lens 220 is placed in front of the sensor 210 so that the combination of the sensor 210 and the lens 220 is associated with a lens pattern. As seen in FIG. 2, the system 200 can also include a video imager 230, such as a video camera, monitoring the region R.

Each of the PIR sensor 210 and the video imager 230 can be in communication with a control panel device 240 in the region R, which can be in communication with a central monitoring station 250. Each of the control panel device 240 and the central monitoring station 250 can include a transceiver 242, 252 device and a memory device 244, 254, each of which can be in communication with respective control circuitry 246, 256, one or more programmable processors 246-1, 256-1, and executable control software 246-2, 256-2 as would be understood by one of ordinary skill in the art. The executable control software 246-2, 256-2 can be stored on a transitory or non-transitory computer readable medium, including, but not limited to local computer memory, RAM, optical storage media, magnetic storage media, flash memory, and the like. In some embodiments, the control circuitry 246, 256, programmable processor 246-1, 256-1, and control software 246-2, 256-2 can execute and control at least some of the methods described above and herein.

Figure 3:
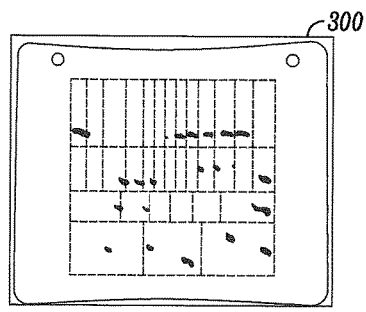
FIG. 3 is an image of a lens pattern in accordance with disclosed embodiments.
Figures 4, 5:
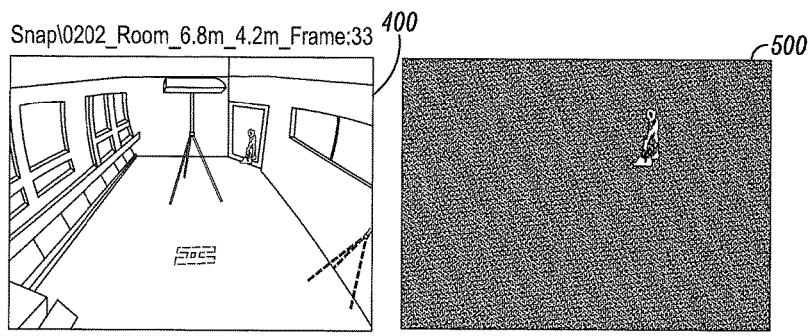
FIG. 4 is an image of a raw image in accordance with disclosed embodiments.
FIG. 5 is an image of a motion image in accordance with disclosed embodiments.

For example, the transceiver device 242 of the control panel device 240 can receive a lens pattern associated with the PIR sensor 210 and the Fresnel lens 220 from the sensor 210, or the control circuitry 246, programmable processor 246-1, and control software 246-2 can retrieve the lens pattern from the memory device 244 of the control panel device 240. In some embodiments, the lens pattern can include the lens pattern 300 shown in FIG. 3. The transceiver device 242 can also receive a sequence of raw images from the video imager 230, and in some embodiments, a raw image received from the video imager 230 can include the raw image 400 shown in FIG. 4.

Figures 6, 7:
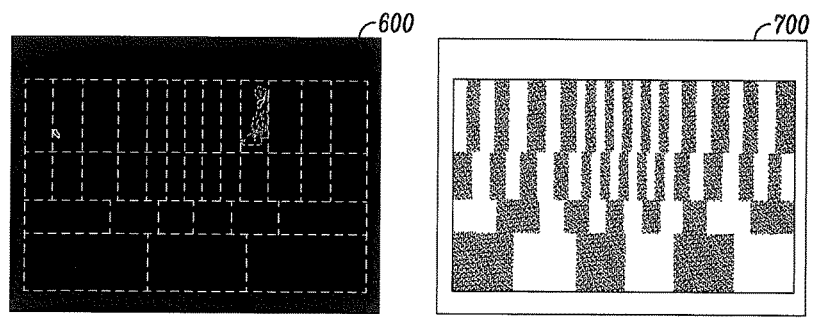
FIG. 6 is an image of a motion image masked with a lens pattern in accordance with disclosed embodiments.
FIG. 7 is an image of a lens pattern split into positive and negative areas in accordance with disclosed embodiments.

The control circuitry 246, programmable processor 246-1, and control software 246-2 can create one or more motion images, for example, by performing image or frame differentiation on the sequence of raw images received from the video imager 230, and can mask at least one of the motion images with the lens pattern. For example, in some embodiments, a motion image can include the motion image 500 shown in FIG. 5, and in some embodiments, the motion image can be masked with the lens pattern as shown in the image 600 of FIG. 6.

In some embodiments, the control circuitry 246, programmable processor 246-1, and control software 246-2 can split each block of the lens pattern into positive and negative areas. For example, in some embodiments, the lens pattern can be split into positive and negative areas as shown in the image 700 of FIG. 7. The control circuitry 246, programmable processor 246-1, and control software 246-2 can identify a positive area pixel value by summing the pixels of the motion image that align with each of the positive areas, identify a negative area pixel value by summing the pixels of the motion image that align with each of the negative areas, identify a motion image response value by subtracting the negative area pixel value from the positive area pixel value, and determine whether the motion image response value is higher than a predetermined value. If so, then the control circuitry 246, programmable processor 246-1, and control software 246-2 can determine that motion has been detected in the monitored region R and cause an alarm to be activated or transmit a signal indicative of the detected motion.

Additionally or alternatively, the control panel device 240 can transmit, to the central monitoring station 250, via the transceiver device 242 and the transceiver device 252, the lens pattern associated with the PIR sensor 210 and the Fresnel lens 220 that the transceiver device 242 receives from the sensor 210 or that the control circuitry 246, programmable processors 246-1, and control software 246-2 retrieve from the memory device 244 and/or the sequence of raw images that the transceiver device 242 receives from the video imager 230. Then, the control circuitry 256, programmable processor 256-1, and control software 256-2 of the central monitoring station 250 can create motion images, mask motion images, split blocks of the lens pattern into positive and negative areas, identify positive area pixel values, negative area pixel values, and motion image response values, and determine whether a motion image response value is higher than a predetermined value and is, therefore, indicative of motion, as described above in connection with such processing being performed by the control panel device 240.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:

creating a motion image from a sequence of raw images of a region by differentiating the sequence of raw images so that the motion image includes pixels representing only portions of the sequence of raw images where there is a difference between at least one of the sequence of raw images and any subsequent ones of the sequence of raw images;

masking the motion image with a lens pattern associated with a PIR sensor and an associated Fresnel lens monitoring the region by overlaying the motion image with the lens pattern;

splitting each of a plurality of blocks of the lens pattern as overlaid on the motion image into a respective first section and a respective second section, wherein the respective first section of each of the plurality of blocks is a respective positive area associated with a first slot of the PIR sensor and the respective second section of each of the plurality of blocks is a respective negative area associated with a second slot of the PIR sensor;

identifying a positive area pixel value as a sum of all of the pixels in the motion image that are aligned with the respective positive area of each of the plurality of blocks;

identifying a negative area pixel value as a sum of all of the pixels in the motion image that are aligned with the respective negative area of each of the plurality of blocks;

subtracting the positive area pixel value and the negative area pixel value as identified from the respective positive area of each of the plurality of blocks and the respective negative area of each of the plurality of blocks of the motion image to identify a motion image response value; and identifying a presence of motion in the region when the motion image response value exceeds a predetermined value.

2. The method of claim 1 further comprising receiving the sequence of raw images from a video imager monitoring the region.

3. The method of claim 1 further comprising receiving the lens pattern from the PIR sensor.

4. The method of claim 1 further comprising retrieving the lens pattern from a memory device.

5. The method of claim 1 further comprising identifying the presence of the motion in the region when the motion image response value exceeds the predetermined value within a predetermined period of time.

6. The method of claim 1 further comprising transmitting a signal indicative of the presence of the motion when the motion image response value exceeds the predetermined value.

7. The method of claim 1 further comprising causing activation of an alarm when the motion image response value exceeds the predetermined value.

8. A system comprising:
   a programmable processor; and
   executable control software stored on a non-transitory computer readable medium,
   wherein the programmable processor and the executable control software create a motion image from a sequence of raw images of a region by differentiating the sequence of raw images so that the motion image includes pixels representing only portions of the sequence of raw images where there is a difference between at least one of the sequence of raw images and any subsequent ones of the sequence of raw images,
   wherein the programmable processor and the executable control software mask the motion image with a lens pattern associated with a PIR sensor and an associated Fresnel lens monitoring the region by overlaying the motion image with the lens pattern,
   wherein the programmable processor and the executable control software split each of a plurality of blocks of the lens pattern as overlaid on the motion image into a respective first section and a respective second section,
   wherein the respective first section of each of the plurality of blocks is a respective positive area associated with a first slot of the PIR sensor and the respective second section of each of the plurality of blocks is a respective negative area associated with a second slot of the PIR sensor,
   wherein the programmable processor and the executable control software identify a positive area pixel value as a sum of all of the pixels in the motion image that are aligned with the respective positive area of each of the plurality of blocks,
   wherein the programmable processor and the executable control software identify a negative area pixel value as a sum of all of the pixels in the motion image that are aligned with the respective negative area of each of the plurality of blocks,
   wherein the programmable processor and the executable control software subtract the positive area pixel value and the negative area pixel value as identified from the respective positive area of each of the plurality of blocks and the respective negative area of each of the plurality of blocks of the motion image to identify a motion image response value, and
   wherein the programmable processor and the executable control software identify a presence of motion in the region when the motion image response value exceeds a predetermined value.

9. The system of claim 8 further comprising a transceiver device, wherein the programmable processor and the executable control software receive the sequence of images, via the transceiver device, from a video imager monitoring the region.

10. The system of claim 8 further comprising a transceiver device, wherein the programmable processor and the executable control software receive the lens pattern, via the transceiver device, from the PIR sensor.

11. The system of claim 8 further comprising a memory device, wherein the programmable processor and the executable control software retrieve the lens pattern from the memory device.

12. The system of claim 8 wherein the programmable processor and the executable control software identify the presence of the motion in the region when the motion image response value exceeds the predetermined value within a predetermined period of time.

13. The system of claim 8 further comprising a transceiver device, wherein the programmable processor and the executable control software transmit, via the transceiver device, a signal indicative of the presence of the motion when the motion image response value exceeds the predetermined value.

14. The system of claim 8 further comprising an alarm device, wherein the programmable processor and the executable control software cause the alarm device to be activated when the motion image response value exceeds the predetermined value.

* * * * *